US008775875B2

(12) United States Patent
Isherwood et al.

(10) Patent No.: US 8,775,875 B2
(45) Date of Patent: Jul. 8, 2014

(54) SYSTEM FOR PROVIDING TRACE DATA IN A DATA PROCESSOR HAVING A PIPELINED ARCHITECTURE

(75) Inventors: Robert Graham Isherwood, Buckingham (GB); Ian Oliver, Leeds (GB); Andrew Webber, Herts (GB)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 1443 days.

(21) Appl. No.: 12/387,152

(22) Filed: Apr. 28, 2009

(65) Prior Publication Data
US 2009/0287907 A1    Nov. 19, 2009

(30) Foreign Application Priority Data

Apr. 28, 2008    (GB) .................................. 0807701.8

(51) Int. Cl.
*G06F 11/34*    (2006.01)
(52) U.S. Cl.
CPC .................................. *G06F 11/348* (2013.01)
USPC .......................................................... 714/45
(58) Field of Classification Search
CPC .................................................... G06F 11/348
USPC .......................................................... 714/45
See application file for complete search history.

(56) References Cited

U.S. PATENT DOCUMENTS

| 4,574,351 | A | 3/1986 | Dang et al. |
| 4,862,352 | A | 8/1989 | Moyer et al. |
| 5,524,224 | A * | 6/1996 | Denman et al. ............... 712/219 |
| 5,564,028 | A | 10/1996 | Swoboda et al. |
| 5,642,478 | A | 6/1997 | Chen et al. |
| 5,724,505 | A | 3/1998 | Argade et al. |
| 5,729,726 | A * | 3/1998 | Levine et al. ................. 712/233 |
| 5,864,697 | A | 1/1999 | Shiell |
| 6,023,759 | A | 2/2000 | Omtzigt |
| 6,094,729 | A | 7/2000 | Mann |
| 6,263,488 | B1 | 7/2001 | Fortin et al. |
| 6,415,378 | B1 | 7/2002 | Davidson et al. |
| 6,615,370 | B1 | 9/2003 | Edwards et al. |
| 7,003,699 | B2 | 2/2006 | Swaine et al. |
| 7,124,072 | B1 | 10/2006 | Thekkath et al. |
| 7,134,117 | B2 | 11/2006 | Swaine |

(Continued)

FOREIGN PATENT DOCUMENTS

| EP | 0 655 684 A1 | 5/1995 |
| EP | 0 869 434 A3 | 10/1998 |

(Continued)

OTHER PUBLICATIONS

UK Search Report dated Jul. 7, 2008 (1 page).

(Continued)

*Primary Examiner* — Robert Fennema
*Assistant Examiner* — Benjamin Geib
(74) *Attorney, Agent, or Firm* — Michael S. Garrabrants

(57) ABSTRACT

The invention is a method and system for providing trace data in a pipelined data processor. Aspects of the invention including providing a trace pipeline in parallel to the execution pipeline, providing trace information on whether conditional instructions are complete or not, providing trace information on the interrupt status of the processor, replacing instructions in the processor with functionally equivalent instructions that also produce trace information and modifying the scheduling of instructions in the processor based on the occupancy of the trace output buffer.

9 Claims, 4 Drawing Sheets

(56) References Cited

U.S. PATENT DOCUMENTS

| | | |
|---|---|---|
| 2002/0010882 A1 | 1/2002 | Yamashita |
| 2003/0135719 A1 | 7/2003 | DeWitt, Jr. et al. |
| 2004/0102950 A1 | 5/2004 | Agarwala et al. |
| 2006/0259750 A1 | 11/2006 | Swoboda |
| 2007/0011492 A1 | 1/2007 | Swaine |
| 2007/0022276 A1* | 1/2007 | Fritz et al. .................... 712/227 |
| 2007/0050600 A1 | 3/2007 | Hill et al. |
| 2008/0183430 A1* | 7/2008 | Kitsunai et al. ............... 702/186 |
| 2009/0037887 A1* | 2/2009 | Chavan ......................... 717/128 |
| 2009/0217010 A1* | 8/2009 | Circello et al. ............... 712/227 |

FOREIGN PATENT DOCUMENTS

| | | |
|---|---|---|
| GB | 2 200 482 A | 8/1988 |
| JP | 01 054547 A | 3/1989 |
| WO | WO 99/54809 | 10/1999 |

OTHER PUBLICATIONS

UK Search Report dated Nov. 21, 2008 (2 pages).
International Search Report dated Oct. 22, 2009 (2 pages).

* cited by examiner

| Event | 15:12 | 11:9 | 8:4 | 3:2 | 1 | 0 | a | b | c | d |
|---|---|---|---|---|---|---|---|---|---|---|
| TTMOV ..., Us.Sreg | 1011 | Us | Sreg | - | P | T | P=[PC] | T=[Tag] | DL | DH |
| MOV TTMARK, ... | 1010 | Data 11:4 | | - | P | T | P=[PC] | T=[Tag] | DL | 0 |

Figure 4

SYSTEM FOR PROVIDING TRACE DATA IN A DATA PROCESSOR HAVING A PIPELINED ARCHITECTURE

FIELD OF THE INVENTION

The present invention relates to data processors having a pipelined architecture and a method and system for providing trace data in such data processors.

BACKGROUND TO THE INVENTION

Early microprocessors worked on just a single instruction at once, so an instruction would be fetched from memory, decoded, executed with an Arithmetic Logic Unit, and the results stored back to registers or memory, before the whole process was then repeated for another instruction.

To allow increases to processor clock speed, modern microprocessors use a feature called a pipeline and they have many instructions proceeding through the various stages of fetch-decode-execution-write at the same time. This allows each stage to involve simpler (and therefore faster) logic, and for some stages that involve longer operations to contain multiple sets of logic so that multiple instructions can be at this stage at the same time. It is not uncommon for modern processors to have pipelines that are ten or more stages deep.

Another feature of modern microprocessors is a trace unit. A trace unit reports the microprocessor's progress through the stream of instructions and writes the data to memory and/or exports it to external equipment via a suitable peripheral interface on the processor. In some cases the information reported by the trace unit is exported immediately, in some cases with a delay due to internal buffering within the microprocessor or in the microprocessor's external memory.

Deep multi-stage pipelines yield performance benefits where there is a stream of instructions, one after another, with no branches or loops within the logic of the program. However, where there is a branch, it becomes very difficult to ensure that the pipeline remains usefully occupied, and there are cases where a large amount of work-in-progress within the pipeline has to be discarded.

Many solutions to this problem have been applied in the past, including complex branch prediction logic, speculative processing of instruction streams along both possible paths after the branch, and many others, often with multiple approaches being used within the same microprocessor.

For example, one simple solution for the case where a short string of instructions (including the case of just a single instruction) are either executed or skipped depending on the some pre-existing state within the microprocessor, is the use of conditional instructions. These instructions have an additional field to indicate the conditions under which they should, or should not, be executed. However, this condition, or conditions, may not have been set to the final condition test result at the time at which the instruction enters the microprocessor's pipeline. Therefore, conditional instructions are allowed to proceed down the pipeline as normal, including the execution stage, but just before the results of the instruction (including any new internal microprocessor state) is stored, a check is done for the condition or conditions under which the instruction should be executed, and only if these conditions are met are the results written to the final destination. This final storage of the results is often called "completion" and an instruction that has proceeded though this stage is said to be "complete" or "completed". For cases where the string of instructions that do not complete is shorter than the depth of the pipeline, the overall throughput of the processor will increase.

When conditional instructions are used at the same time as deep pipelines and trace units, there are a couple of standard, alternative approaches to reporting the instructions, neither of which is entirely satisfactory. The conditional instruction can be always reported, which will reduce the accuracy of the data and potentially confuse the user. Alternatively, reporting of the instruction can be suppressed entirely if it does not complete. Which approach is used often depends on where within the pipeline the trace unit is connected. If it is connected early within the pipeline, all instructions will be reported, whether completed or not. If it is connected at the final completion stage, it is easy to report only completed instructions, but sometimes a lot of information regarding the instruction has been discarded at this stage, which makes the information reported by the trace unit less useful.

Similarly, difficulties arise in analysing trace data when programs are interrupted or branch instructions speculatively fetched but not executed. There is therefore a need to be able to provide trace data that is straightforward to analyse and to have the flexibility to include or discard parts of the trace data as required in the circumstances.

SUMMARY OF THE INVENTION

The invention in its various aspects is defined in the independent claims, to which reference should now be made. Advantageous features are set forth in the dependent claims.

In a first aspect, the present invention provides a data processor comprising:
  an instruction fetch unit for fetching program instructions, including conditional instructions,
  an execution pipeline having a plurality of execution stages;
  an instruction scheduler connected between the instruction fetch unit and the execution pipeline for scheduling the passing of instructions to the execution pipeline;
  a trace pipeline connected to scheduler in parallel to the execution pipeline, wherein the trace pipeline has a plurality of stages and carries trace data corresponding to instructions in the execution pipeline;
  a trace output coupled to an output of the trace pipeline; and
  means for performing a determination of whether a conditional instruction in the execution pipeline should be completed and for adding the result of the determination to the corresponding trace data in the trace pipeline.

In a second aspect, the present invention provides a method of providing trace data from a pipelined data processor, the data processor comprising an instruction scheduler connected to an execution pipeline for scheduling the passing of instructions to the execution pipeline, a trace pipeline connected to scheduler in parallel to the execution pipeline, the trace pipeline having a plurality of stages and a trace output coupled to an output of the trace pipeline, comprising the steps of:
  passing instructions, including conditional instructions from the scheduler to the execution pipeline;
  passing trace data corresponding to the instructions to the trace pipeline;
  performing a determination as to whether a conditional instruction should be completed in the execution pipeline; and
  adding the result of the determination to the corresponding trace data in the trace pipeline.

In accordance with the first and second aspects of the invention, trace data corresponding to all conditional instructions processed by the data processor, whether completed or not, can be reported by a trace unit. Additional information can also be included in the trace output that indicates whether the instruction has completed. This approach ensures that it is clear to a user exactly which instructions were not completed, and if desired, external equipment can even remove reference to these instructions from the information displayed to the user. An additional benefit is that the user can analyse the data, either directly or with computer assistance, to see whether strings of conditional instructions delivered the expected performance benefits.

In accordance with a third aspect, the invention provides a data processor comprising:
  a scheduler for scheduling instructions to be executed;
  an execution pipeline having a plurality of execution stages connected to the scheduler;
  a trace pipeline having a plurality of stages, connected to the scheduler in parallel with the execution pipeline;
  a trace output connected to a final stage of the trace pipeline;
  a means for adding data to the data from the trace pipeline, having an input connected to a final stage of the execution pipeline and an output connected to the trace output, wherein, in use, the means for adding data selectively outputs information relating to instructions completed by the execution pipeline to the trace output synchronously with corresponding data output from the trace pipeline.

In accordance with a fourth aspect, the invention provides a method of providing trace data from a pipelined data processor, the data processor comprising an execution pipeline having a plurality of stages, an instruction scheduler connected to an execution pipeline for scheduling the passing of instructions to the execution pipeline, a trace pipeline connected to scheduler in parallel to the execution pipeline, the trace pipeline having a plurality of stages and a trace output connected to an output of the trace pipeline, comprising the step of adding information relating to instructions completed by the execution pipeline to corresponding data output from the trace pipeline.

In accordance with a fifth aspect, the invention provides a method of reporting performance information relating to the execution of a program in a data processor, comprising the steps of:
  replacing an existing instruction that performs a primary task within a program with an alternative instruction that performs the same primary task, but which has an additional effect of reporting performance information relating to the execution of the program to a trace output.

Preferably, the step of replacing a program instruction is performed automatically by a compiler. Preferably, the alternative instruction also has an effect of reporting data acted on by the instruction to the trace output.

In accordance with a sixth aspect, the invention provides a data processor comprising:
  a plurality of functional units for processing program instructions;
  an instruction fetch unit for fetching program instructions from a memory;
  an instruction scheduler, connected to the instruction fetch unit and to the plurality of functional units for determining when the fetched instructions are issued to the functional units;
  a trace data output connected to the scheduler for outputting trace data relating to the operation of the processor;
  wherein the instruction fetch unit includes branch prediction logic that is used to determine which instructions are fetched from memory following the fetching of a branch instruction, wherein the instruction fetch unit outputs branch prediction information associated with fetched instructions to the scheduler, and wherein the processor determines if the branch prediction information is correct by checking if a condition (or conditions) associated with the branch instruction have been met, and adds a result of the determination to the trace data, In accordance with a seventh aspect, the invention provides a method for providing branch prediction information in processor trace data, comprising the steps of:
  fetching instructions to be executed by the processor from a memory;
  making a prediction, following a fetched branch instruction, of which instructions to subsequently fetch from memory;
  determining, within the processor, whether the prediction is correct by checking if a condition (or conditions) associated with the branch instruction has been met, and adding a result of the step of determining to the trace data.

In accordance with an eighth aspect, the present invention provides a data processor comprising:
  an instruction fetch unit for fetching program instructions,
  an execution pipeline comprising a plurality of functional units;
  an instruction scheduler connected between the instruction fetch unit and the execution pipeline for scheduling the passing of instructions to the execution pipeline;
  a trace output coupled to the scheduler, wherein the scheduler passes trace data relating to scheduled instructions to the trace output; and
  means for passing interrupt or exception status information associated with the processor to the scheduler, wherein the scheduler includes an indication of the interrupt or exception status information in the trace data.

In accordance with a ninth aspect, the present invention provides a method of providing trace data from a pipelined data processor, the data processor comprising an instruction scheduler connected to an execution pipeline for scheduling the passing of instructions to the execution pipeline, and a trace output connected to scheduler, comprising the steps of:
  inputting processor interrupt or exception data to the scheduler;
  passing the processor interrupt or exception data to the trace output together with associated trace data relating to scheduled instructions.

In accordance with a tenth aspect, the invention provides a data processor comprising:
  an instruction scheduler for scheduling instructions to be executed by the data processor; and
  a trace unit coupled to the instruction scheduler for receiving trace data relating to scheduled instructions, the trace unit having a trace output for connection with an external device, a trace output buffer connected to the trace output for storing trace data prior to passing it to the trace output, and a trace impact counter connected to the trace output buffer and to the scheduler,
  wherein, in use, the trace output buffer sends buffer occupancy data to the scheduler, the scheduler modifies the scheduling of instructions based on the buffer occupancy data and sends an indication that the scheduling has been modified to the trace impact counter, and the trace impact counter adds an indication that the scheduling has been modified to trace data sent to the trace output buffer.

In accordance with an eleventh aspect, the invention provides a method of providing trace data from a data processor, the data processor including a scheduler for scheduling instructions to be executed by the data processor and trace unit including a trace output buffer for storing trace data prior to output of the trace data to an external device, comprising the steps of:

sending an indication of space available in the trace output buffer to the scheduler, modifying the scheduling of instructions based on the indication of space available, and including in the trace data an indication of the modifying of the scheduler.

Each of the aspects of the invention may be provided alone or in combination with one or more of the other aspects of the invention in a data processing device.

BRIEF DESCRIPTION OF THE DRAWINGS

An example embodying the various aspects of the invention will now be described in detail, with reference to the accompanying drawings, in which:

FIG. 4 illustrates an example of trace data at the trace output of FIG. 1.

DETAILED DESCRIPTION

Figure 1:
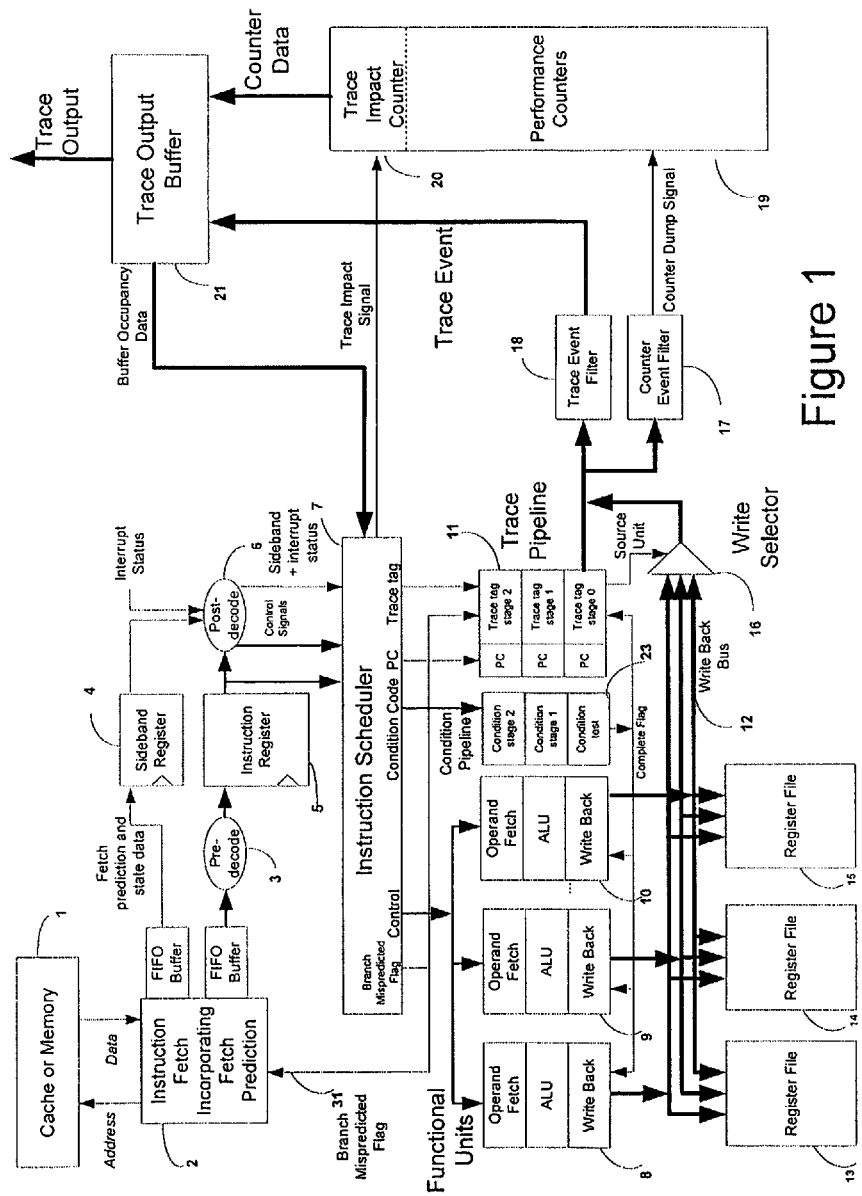
FIG. 1 show the architecture of an example processor including a trace mechanism in accordance with the present invention.

FIG. 1 is a schematic illustration of the features of a data processor in accordance with an example of the present invention. FIG. 1 shows only processing units for a single thread. However, the same functional architecture may be applied to a multi-threaded processor.

Each of the units shown in FIG. 1 will now be described.

A cache or memory 1 is the source of the instructions to be executed by the processor. The instructions may be held in internal or external addressable memory or in a copy of this memory held in an instruction cache.

An instruction fetch unit 2 is connected to the cache 1. This unit pre-fetches instructions from the cache or memory. As part of this process, it attempts to predict whether conditional branches will/won't be taken to try and ensure that the correct instructions are pre-fetched. This is explained in more detail with reference to FIG. 3.

The fetch unit 2 outputs both pre-fetched instructions and also sideband data relating the state and actions of the instruction fetch unit including whether a branch was predicted to be taken or not. Both of these outputs have first-in-first-out buffers (FIFOs) to buffer data prior to sending it to later stages. These FIFOs are the same length and data is taken from them at the same time to ensure that the instructions and the related sideband information are synchronously delivered to the sideband and instruction registers.

A pre-decode unit 3 takes the instructions to be executed from the instruction fetch unit 2 and generates from them additional data that specifies the resources that will be required by the instruction when it executes. This data includes which functional units are required, which source and/or destination registers are used, what memory I/O will be required, etc.

A sideband register 4 stores the sideband data from the instruction fetch unit. The data in this register is related to the instruction that is waiting to be issued.

An instruction register 5 stores the instruction data from the pre-decode unit 3. The data in this register is related to the instruction that is waiting to be issued.

A post-decode 6 unit takes the data from the instruction register 5 and the sideband register 4 and performs additional decoding that allows the instruction to be executed. The main output, which is sent to the scheduler 7, is a complex set of control signals that are used to control all of the later stages of instruction execution. Additionally, there is another output, also sent to the scheduler 7, that consists of the sideband data from the instruction fetch plus additional information relating to the interrupt processing state of the processor.

Most processors include mechanisms called interrupts and exceptions that cause the normal flow of instruction execution in the main program to be paused briefly while an alternative instruction stream is executed. This makes analysing the trace data to understand the execution path and timings of the program difficult and potentially error prone, particularly if interrupts or exceptions are nested such that another alternative instruction stream starts executing before execution has resumed in the main program.

The interrupt status information may be received from a trigger unit that monitors the input ports and internal state of the processor for interrupt signals or exception events. The trigger unit feeds this information to the post-decode unit 6, where it is included with the sideband data. Alternatively, the interrupt status information may be generated by the scheduler or may be received by from a number of sources, both internal and external. As stated above, the generation of an interrupt signal is well known in data processors.

The interrupt/exception data added to the trace data indicates when the processor starts to process an alternative instruction stream as a result of an interrupt or exception, and when execution of this alternative stream ceases. The trace data can be filtered on the basis of the interrupt status in the trace event filter if desired. For example, some or all of the usual trace data can be suppressed while alternative instruction streams are being executed. Alternatively, additional trace data can be included when interrupt processing starts or ends to allow these events to be detected in the trace data. The interrupt/exception data is added to the trace data for a given instruction at the time the instruction issues and is then passed through the trace pipeline. This ensures that relevant interrupt/exception data is tied to the trace data at the trace output.

The instruction scheduler 7 takes the instruction stream from the instruction register and uses information regarding the current activities of the rest of the processor, as well as the information from the post-decode unit 6, to evaluate when to issue the instruction to the functional units 8, 9, 10. As the instructions are issued to the functional units, corresponding trace data and program counter data are sent to the trace pipeline 11.

The functional units 8, 9, 10 form execution pipelines. The pipelines receive instructions from the instruction scheduler and execute these in a number of stages. In this example the stages are operand fetching from a source, processing by the arithmetic logic unit, and then conditionally writing the results to the destination. This write back is called "completion" and an instruction that has undergone this conditional process is referred to as one that has "completed".

Parallel to the execution pipelines is the trace pipeline 11. This unit receives much of the same data that is supplied to the functional units and additionally trace tag data and the program counter data. The trace tag data includes the sideband and interrupt status data. This data is fed though a pipeline that has the same number of stages as the execution pipelines so that the data is delayed and reaches the end of the trace pipeline at the same time as the functional units are conditionally completing the corresponding instructions.

In this example, a condition pipeline 23 determines whether any conditional instructions should be completed. It is not possible to make this determination before the instructions are passed to the execution pipeline. The condition pipeline therefore performs the determination (herein referred to as a condition test) during a later cycle and presents the result of the condition test to both the appropriate functional unit in the execution pipeline and the trace pipeline. In the example shown, the condition test result is not passed to the functional units and trace pipeline until three cycles after the instruction issues, so the data actually feeds into the last stage of the execution pipeline 8 and trace pipeline 11. This is described in more detail with reference to FIG. 2.

Figure 2:
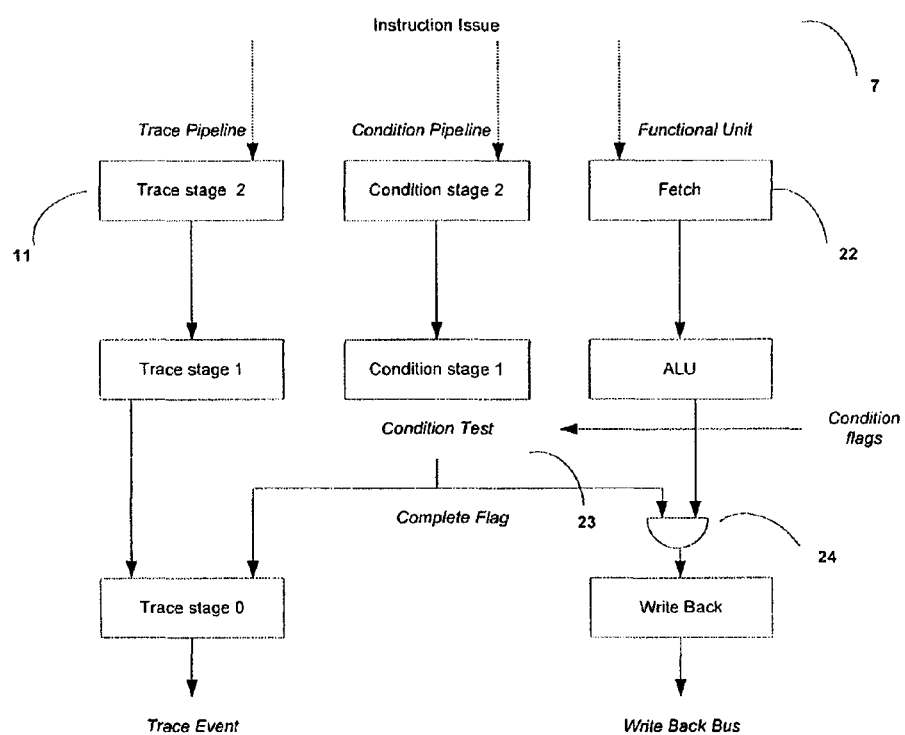
FIG. 2 illustrates the condition pipeline connected to the trace pipeline and execution pipeline of FIG. 1.

FIG. 2 shows a condition pipeline 23 operating in parallel with the trace pipeline 11 and the execution pipelines. Only a single execution pipeline 22 is shown for clarity. When an instruction is issued, the scheduler 7 instructs the relevant execution pipeline to fetch the relevant data and perform its function. At the same time, trace data relating to the instruction is passed to the trace pipeline 11 and condition data relating to the conditions under which the instruction should be completed are sent to the condition pipeline 23. At the stage immediately prior to completion (or prior to whichever stage the conditions must be met by) the condition pipeline performs a condition test (or multiple condition tests) to check if the conditions for completion of the instruction have been met. The condition pipeline fetches a condition flag from a control register for the particular condition in the program, and performs a condition test. The result of the test, in the form of a complete flag, is then sent to the execution pipeline and added to the data in the trace pipeline. Logic 24 in the execution pipeline receives the complete flag and uses it to determine if the instruction is passed to the next stage i.e. completion.

Accordingly, in this system, trace data relating to a conditional instruction is fed through the trace pipeline, whether the instruction completes or not. An indication of completion status is added to the trace data at a final stage in the trace pipeline. The trace data can be filtered based on the completion status so that only trace data relating to completed instructions in included in the trace output data.

It is possible for the complete flag to be passed to the trace pipeline via the execution pipeline or via the scheduler. It is also possible for the scheduler to perform the condition test instead of a dedicated condition pipeline.

Referring again to FIG. 1, every functional unit is able to optionally write its computation results to either its own register file or to that of any other functional unit. Several such writes can happen at the same time. This is done via a write back bus 12 that interconnects every functional unit's output to one of the multiple write inputs of the register files. Additionally, the outputs of all of the functional units are connected to the write selector.

The register files 13, 14, 15 hold all of the processor registers and there is one bank of such registers for each functional unit. The register files have multiple write ports and they can therefore accept multiple writes per cycle.

So that the computation results from the functional units can also be provided via the trace mechanism, a write selector 16 is connected to the write back bus 12 and it takes the data from the relevant functional unit and combines it with the data coming from the trace pipeline.

The write selector 16 adds data to the trace data from the trace pipeline on the basis of control signals from the trace pipeline 11. The control signals are indicative of the type of trace event and the source unit and source register for the data. This information is part of the trace data from the scheduler 7 and is shown in FIG. 1 passing from the final stage of the trace pipeline to the write selector. From this control information, the write selector can determine whether data needs to be added and if so, from which arm of the write back bus data should be taken. This is further explained with reference to FIG. 4. The conditions under which the write selector 16 adds data can be chosen by the user, as desired.

Through the use of specially adapted program code, it is also possible to get further performance data included in the trace output. There are many ways of generating additional performance data, and one common one is to place "instrumentation" code into the program, either manually or automatically within a compiler and/or library functions. This instrumentation code is additional code that reports information useful for analysing the performance of the program. The performance information that is reported is either stored within the microprocessor system or is moved outside this system; and in both cases can be collated and analysed either immediately or at a later time. However, instrumentation code changes both the size of the program and the timing of its execution, which limits the accuracy and thus usefulness of the performance information.

In accordance with an aspect of the invention, existing instructions within the program to be executed are replaced, either manually or automatically, with trace-side-effect instructions that perform the same primary task, but which have an additional effect or side-effect of generating performance information broadly similar to that generated by traditional instrumentation code. Use of these trace-side-effect instructions will not affect the size, primary functionality or execution timing of the program, thereby making the performance information far more accurate and useful.

These trace-side-effect instructions can be placed anywhere within the program, but are preferably used within the preamble and post-amble of functions and sub-functions within the program. The preamble and post-amble are parts of the code of a function that are generated by a compiler to save/restore important registers, create a stack frame, to ensure that parameters being passed to the function are placed in the correct places, and many other tasks that are important but outside the direct control of the author of the program. In a preferred example, the instructions replaced are used to construct and destruct the frame pointer of the function. The compiler that translates the source code of the program into the machine executable version can have a mode whereby some instructions in the preamble and post-amble are replaced automatically with the trace-side-effect versions thereby allowing performance information to be reported.

Many types of information can be reported by the trace-side-effect instructions, including but not limited to the location of the instruction, the values of data being manipulated by the primary function of the instruction, timing information from within the processor system, values of event counters within the processor system, and internal status and states of the processor system.

One implementation of the trace-side-effect instructions also provides a system for examining parts of the instruction code of the instruction and/or values of data manipulated by the primary task of the instruction and/or any of the other performance data that would be reported by the instruction, and using this to determine whether the performance data should be reported in full, in part, or not at all.

Another implementation of the trace-side-effect instruction mechanism allows control of whether the performance data should be reported in full, in part, or not at all, based on the location in memory of the trace-side-effect instruction.

An example of a trace side-effect instruction is given below. The trace side-effect instructions replace a normal MOV instruction with a variant that does exactly the same but also generates trace data. This instruction is called TTMOV.

One common use of the unit-to-unit TTMOV transfer instruction is, for example, to identify call entry and exit points to enable call-graph related trace data to be collected. A compiler flag tells the compiler to use TTMOV rather than MOV in the two specific places shown below.

ARoutine: TTMOV D0FrT, A0FrP; Trace push of frame pointer
    ADD A0FrP, A0StP, #9
    SETL [A0StP++], D0FrT, D1RtP
    . . . . Body of routine
    GETL D0FrT, D1RtP, [—A0StP]
    TTMOV A0FrP, D0FrT; Trace pop of frame pointer
    MOV PC, D1RtP Because the trace effect is a side-effect of a unit-to-unit move instruction the instructions function normally as part of the entry and exit sequences of the program when trace recording is disabled at run-time.

Referring again to FIG. 1, data from the trace pipeline 11 and write selector 16 can be filtered. The counter event filter 17 uses information regarding the type of instruction that's completing and the source unit and source register to determine whether to instruct the performance counters 19 to output their data to the trace output buffer 21. The instruction to output data to the trace output buffer 21 is a counter dump signal. This trace event filter has registers allowing it to be configured in relation to which trace events from which registers do/don't generate the counter dump signal.

A trace event filter 18 has registers allowing it to be configured in relation to which trace events do/don't get passed to the trace output buffer. There is also control over the type/quantity of information that's passed to the trace output buffer, with options including just the type of event, the corresponding program counter, the source register/unit, and the computation result from the functional unit. This is described with reference to FIG. 4, which illustrates the structure of some example trace data.

The performance counter unit 19 contains a number of counters that increment when various events occur within the processor. When the Counter Dump Signal is received, the counter data accumulated in these counters is written to the trace output buffer 21 and all of the counters are reset to zero.

The trace output buffer 21 is a multi-stage buffer that takes both the trace event data and the counter data, stores it in a buffer and then supplies this data to the trace output.

As the instruction execution speed of the processor will usually exceed the speed of the interface used for exporting the trace data and because the width of external buses may not be the same as the internal buses, a situation can often be reached where either some trace data must be omitted or the processor must pause briefly to allow the trace data export to catch up. If the choice is to pause the processor, then the execution timings of the program will be different to the execution timings that would occur if the trace data were not exported.

The trace output buffer 21 is required to handle short-term peaks in the data rate. In accordance with an aspect of the invention, if these peaks are such that the trace output buffer fills, in the simplest embodiment, the trace output buffer asserts a Buffer Full Flag. This flag causes the instruction scheduler 7 to cease sending instructions to the functional units so that the trace output buffer 21 can make room for additional data by continuing to send data to the trace output while the sources of data are paused.

The trace impact counter 20 is one of the counters within the performance counter unit 19. It is connected to the scheduler and counts the cycles during which the scheduler is not issuing instructions due to the trace output buffer asserting the Buffer Full Flag or indicating that is close to full capacity. The trace impact counter data is included in the trace data when the performance counter unit sends its contents to the trace output. It is possible for the trace impact counter to receive the Buffer Full Flag directly from the trace output buffer 21 instead of receiving a signal from the scheduler 7.

Every cycle that the scheduler is in a state of waiting for the trace output buffer 21 to de-assert the Buffer Full Flag, the trace impact counter 20 is incremented. An alternative scheme is for the instruction scheduler 7 to continue to issue instructions that will not generate trace data as these will not require room in the trace output buffer.

Another possible embodiment is for the Buffer Full Flag to be replaced with a signal that indicates the available room in the buffer 21 and for the instruction scheduler 7 to make complex decisions regarding which instructions it can/cannot issue based on available trace output buffer capacity.

Figure 3:
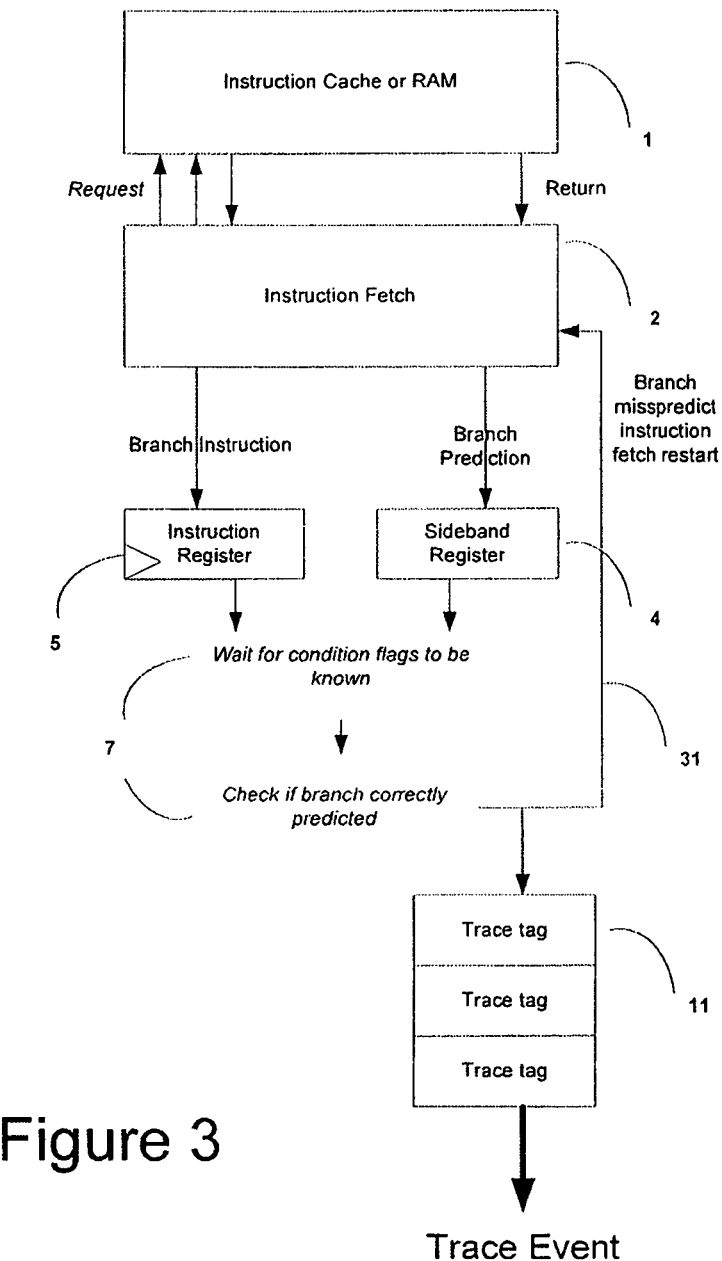
FIG. 3 illustrates a mechanism for including branch prediction information into trace data.

FIG. 3 illustrates in more detail, the mechanism for including branch prediction information in the trace data shown in FIG. 1. The instruction fetch unit 2 fetches instructions from memory 1 and makes a prediction of whether a particular branch in the program instructions will be taken following a branch instruction. This is a well understood process and many available processors include branch prediction logic of some kind. A typical and simple prediction system is for all backward branches in a program (i.e. loops) to be taken and all forward branches in a program (i.e. jumps) not to be taken, but prediction algorithms can be massively more complex than this. The fetched instructions are sent to the instruction register 5. The branch prediction information is sent to the sideband register 4. The instructions are not issued and scheduled until the conditions for issue associated with the branch instruction have been checked and met by scheduler 7. If the conditions are not met, and the prediction is found to be wrong, the scheduler instructs the fetch unit to fetch the correct instructions. This is illustrated in FIG. 3 as arrow 31. If the conditions are met, the instruction will issue. Ordinarily, a branch prediction system simply acts on the prediction information and then discards it. However, in an aspect of this invention, as shown in FIGS. 1 and 3, the prediction information is passed through the processor (and in this example a trace pipeline 11) to the trace output. The prediction information can be used to assess and improve the branch prediction hardware and/or provide information on how compiler code can be written to improve prediction accuracy. The prediction information added to the trace data as the corresponding instruction issues and is maintained in synch with the rest of the trace data relating to that instruction, so that analysis of the output trace data is straightforward.

It can be seen that having a trace pipeline in parallel with the execution pipelines has a number of benefits. It allows trace data relating to different stages of the processing of an instruction to be maintained together in the trace data. Sideband data relating to branch prediction and interrupt status as well as completion status of conditional instructions, trace data from the results of completed instructions and scheduling data, all relating to the same instruction is passed to the trace output as a single trace data unit. The system and method of the present invention allows the unit to be selectively filtered based on a plurality of different criteria, as desired.

FIG. 4 illustrates examples of the trace data for two different events, TTMOV and MOV TTMARK, which are sent to the trace output. The trace events consist of a 16-bit field that is used to identify the event, followed by four 32-bit fields a, b, c, d of optional following data.

Referring to FIG. 4, the type of event is specified by a 4-bit code in bits 15:12. The type of event also indicates the amount of the following data and guides the interpretation of the following data. Bits 11:4 indicate the source unit (Us) and source register (Sreg) if the event is "TTMOV". Bits 11:4 indicate immediate data if the event is "MOV TTMARK". Bits 3:2 indicate which thread the event relates to in a multi-threaded architecture. Bit 1 (P) is a flag to indicate that program counter (PC) data is in following data. Bit 0 (T) is a flag to indicate that tag data is in following data.

The trace event filter 18 and counter event filter 17 examine the 16-bit field to decide whether to pass the event through and (in the case of the trace event filter) whether to remove extraneous data. For example; the trace event filter 18 may be configured to pass trace data having selected event codes to the trace output but to strip off some of the following trace side-effect data.

The following data is split into four 32-bit blocks, a, b, c and d. a is optional following data that holds program counter (PC) data. b is optional following data that holds tag data. The tag data in block b includes the branch prediction information, the interrupt status information and the complete flag information. c is optional following data that holds the lower 32-bits of data output by a trace side-effect instruction and some other trace instructions. d is optional following data that holds the upper 32-bits of data output by trace side-effect instruction and some other trace instructions.

The operation of the write selector 16 can be better understood with reference to this trace data. The write selector 16 receives control information from the trace pipeline 11 corresponding to the trace event, source unit and source register fields. On the basis of this control information, the write selector determines if additional data is to be added to the trace event and from which execution pipeline 8 (and hence from which arm of the write back bus 12) it should come. The write selector 16 then adds data from trace side-effect instructions and/or other data relating to completed instructions to the trace data in blocks c and d.

The diagrams and explanation herein describe the invention implemented for a single threaded processor however the invention is equally applicable to a multi-threaded processor. In a multi-threaded processor, each execution thread of the processor will require a separate condition pipeline, the functional-units will need to be informed as to which thread's registers they are operating upon, and the corresponding register files will need to contain multiple banks of registers with one bank per thread. This will then enable the functional units to read and write the registers for the thread for which they are executing an instruction, and additionally enable the functional units to determine which condition pipeline to consult to see whether to complete the instruction. A multithreaded processor is described more fully in GB2311882.

PREFERRED ASPECTS OF INVENTION

In one aspect of the invention there is provided a data processor comprising: an instruction fetch unit for fetching program instructions, including conditional instructions: an execution pipeline having a plurality of execution stages; an instruction scheduler connected between the instruction fetch unit and the execution pipeline for scheduling the passing of instructions to the execution pipeline; a trace pipeline connected to scheduler in parallel to the execution pipeline, wherein the trace pipeline has a plurality of stages and carries trace data corresponding to instructions in the execution pipeline; a trace output coupled to an output of the trace pipeline; and means for performing a determination of whether a conditional instruction in the execution pipeline should be completed and for adding the result of the determination to the corresponding trace data in the trace pipeline.

Preferably the means for performing a determination is a condition pipeline having an input connected to the scheduler, parallel to the trace pipeline and the execution pipeline, and an output connected to the execution pipeline and to the trace pipeline.

Preferably the output of the condition pipeline is connected to a final stage of the trace pipeline.

Preferably the result of the evaluation is passed to the trace data via the execution pipeline.

Preferably the trace pipeline has the same number of stages as the execution pipeline.

Preferably, the data processor further comprises a trace data filter connected between the output of the trace pipeline and the trace output, wherein the trace data filter passes only selected trace data to the trace output.

Preferably, the data processor further comprises an adding means for adding data to the trace data, the adding means having an input connected to a final stage of the execution pipeline and an output connected to the trace output, wherein, in use, the adding means selectively adds information relating to instructions completed by the execution pipeline to the trace data synchronously with corresponding data output from the trace pipeline.

Preferably the adding means outputs information relating to the performance of instructions and/or information relating to the results of instructions.

Preferably, the data processor further comprises a write back bus, wherein the write back bus connects the outputs of a plurality of execution pipelines to the adding means.

Preferably, the adding means is configured to add data to the trace data based on the type of instruction to which the trace data relates.

Preferably, the adding means receives control signals indicative of the type of instruction to which the trace data relates from the trace pipeline.

Preferably the instruction fetch unit includes branch prediction logic for predicting which program instructions should be fetched following fetching of a branch instruction, wherein the instruction fetch unit passes branch prediction information associated with fetched instructions to the scheduler, and wherein the scheduler determines if the branch prediction information is correct by checking if a condition associated with the branch instruction has been met, and adds the result of the determination to the trace data.

Preferably the branch prediction information is sent from the instruction fetch unit to the scheduler in parallel with, and synchronously with, corresponding fetched instructions.

Preferably the scheduler receives or determines interrupt or exception status information indicative of the processor entering different operating mode, and wherein the scheduler includes an indication of the interrupt or exception status information in the trace data.

Preferably, the data processor further comprises a trace output buffer connected between the output of the trace pipeline and the trace output for storing trace data prior to passing it to the trace output, and a trace impact counter connected to the trace output buffer and to the scheduler, wherein, in use, the trace output buffer sends buffer occupancy data to the scheduler, the scheduler modifies the scheduling of instructions based on the buffer occupancy data and sends an indication of the modification of scheduling to the trace impact counter, and the trace impact counter adds an indication of the modification of scheduling to trace data sent to the trace output buffer.

Preferably the scheduler pauses scheduling of instructions based on the trace output buffer occupancy data.

Preferably the buffer occupancy data is an indication that the trace output buffer is full.

In another aspect of the invention there is provided a method of providing trace data from a pipelined data processor, the data processor comprising an execution pipeline having a plurality of stages, an instruction scheduler connected to an execution pipeline for scheduling the passing of instructions to the execution pipeline, a trace pipeline connected to the instruction scheduler in parallel with the execution pipeline, the trace pipeline having a plurality of stages, and a trace output connected to an output of the trace pipeline, comprising the steps of: passing instructions, including conditional instructions, from the scheduler to the execution pipeline; passing trace data corresponding to the instructions to the trace pipeline; performing a determination as to whether a conditional instruction should be completed by the execution pipeline; and adding the result of the determination to the corresponding trace data in the trace pipeline.

Preferably, the method further includes the step of filtering the trace data from the output of the trace pipeline.

Preferably the step of adding the result of the condition test to the corresponding trace data comprises adding the result of the condition test to the trace data at a final stage of the trace pipeline.

Preferably, the data processor further comprises the step of adding information relating to instructions completed by the execution pipeline to the trace data synchronously with corresponding data output from the trace pipeline.

Preferably the information relating to instructions completed is information relating to the performance of the instructions and/or information relating to the results of the instructions.

Preferably, the data processor further comprises replacing an existing instruction that performs a primary task within a program to be executed by the processor with an alternative instruction that performs the same primary task, but which has a side-effect of reporting to a trace output performance information relating to the execution of the instruction and/or information relating to the result of the instruction.

Preferably, the data processor further comprises the steps of predicting which set of instructions in a program being executed to fetch from memory following the fetching of a branch instruction, passing branch prediction information associated with the fetched instructions to the scheduler, determining if the branch prediction information is correct by checking if a condition associated with the branch instruction has been met, and adding the result of the determination to the trace data.

Preferably, the data processor further comprises the steps of: providing processor interrupt or exception data to the scheduler; adding the processor interrupt or exception data to the corresponding trace data.

Preferably, the processor further comprises a trace output buffer for storing trace data prior to output to an external device or to memory, further comprising the steps of: sending an indication of space available in the trace output buffer to the scheduler, modifying the scheduling of instructions based on the indication of space available, and including in the trace data an indication of the modifying of scheduling.

Preferably, the step of modifying the scheduling of instructions is pausing the scheduling of instructions.

Preferably, the indication of space available in the trace output buffer is an indication that the trace output buffer is full.

In a further aspect of the invention, there is provided a data processor comprising: a scheduler for scheduling instructions to be processed; an execution pipeline having a plurality of execution stages connected to the scheduler; a trace pipeline having a plurality of stages, connected to the scheduler in parallel with the execution pipeline, for carrying trace data corresponding to instructions in the execution pipeline; a trace output connected to a final stage of the trace pipeline; and an adding means for adding data to the trace data, the adding means having an input connected to a final stage of the execution pipeline and an output connected to the trace output, wherein, in use, the adding means selectively adds information relating to instructions completed by the execution pipeline to the trace data synchronously with corresponding data output from the trace pipeline.

Preferably, the trace pipeline has the same number of stages as the execution pipeline.

Preferably, the data processor further comprises a trace data filter connected between an output of the trace pipeline and the trace output, wherein the trace data filter passes only selected trace data to the trace output.

Preferably, the adding means outputs information relating to the performance of instructions and/or information relating to the results of instructions.

Preferably, the data processor further comprises a write back bus, wherein the write back bus connects the outputs of a plurality of execution pipelines to the adding means.

Preferably the adding means is configured to add data to the trace data based on the type of instruction to which the trace data relates.

Preferably the adding means receives control signals indicative of the type of instruction to which the trace data relates from the trace pipeline.

Preferably, the data processor further comprises an instruction fetch unit for fetching program instructions, wherein the instruction fetch unit includes branch prediction logic for predicting which program instructions should be fetched following fetching of a branch instruction, wherein the instruction fetch unit passes branch prediction information associated with fetched instructions to the scheduler, and wherein the scheduler determines if the branch prediction information is correct by checking if a condition associated with the branch instruction has been met and adds the result of the determination to the trace data.

Preferably the branch prediction information is sent from the instruction fetch unit to the scheduler in parallel with, and synchronously with, corresponding fetched instructions.

Preferably the scheduler receives or determines interrupt or exception status information indicative of the processor entering different operating mode, and wherein the scheduler includes an indication of the interrupt or exception status information in the trace data.

Preferably, the data processor further comprises a trace output buffer connected between the output of the trace pipeline and the trace output for storing trace data prior to passing it to the trace output, and a trace impact counter connected to the trace output buffer and to the scheduler, wherein, in use, the trace output buffer sends buffer occupancy data to the scheduler, the scheduler modifies the scheduling of instructions based on the buffer occupancy data and sends an indication of the scheduling modification to the trace impact counter, and the trace impact counter adds an indication of the scheduling modification to trace data sent to the trace output buffer.

Preferably the scheduler pauses scheduling of instructions based on the buffer occupancy data.

Preferably the buffer occupancy data is an indication that the trace output buffer is full.

In a further aspect of the invention, there is provided a method of providing trace data from a pipelined data processor, the data processor comprising an execution pipeline having a plurality of stages, an instruction scheduler connected to an execution pipeline for scheduling the passing of instructions to the execution pipeline, a trace pipeline connected to scheduler in parallel to the execution pipeline, the trace pipeline having a plurality of stages and a trace output connected to an output of the trace pipeline, comprising the step of adding information relating to instructions completed by the execution pipeline to corresponding data output from the trace pipeline.

Preferably the information relating to instructions completed is information relating to the performance of the instructions and/or information relating to the results of the instructions.

We claim:

1. A method of providing trace data from a data processor, the data processor including a scheduler for scheduling instructions to be executed by the data processor and a trace unit including a trace output buffer for storing trace data prior to output of the trace data to an external device, comprising:
    sending an indication of space available in the trace output buffer to the scheduler;
    pausing the scheduling of instructions based on the indication of space available; and
    including in the trace data the number of cycles for which the scheduling of instructions has been paused.

2. A data processor according to claim 1, wherein the indication of space available in the trace output buffer is an indication that the trace output buffer is full.

3. A data processor comprising:
    an instruction scheduler for scheduling instructions to be executed by the data processor; and
    a trace unit coupled to the instruction scheduler for receiving trace data relating to scheduled instructions, the trace unit having a trace output for connection with an external device, a trace output buffer connected to the trace output for storing trace data prior to passing it to the trace output, and a trace impact counter connected to the trace output buffer and to the scheduler,
    wherein the trace output buffer is configured to send buffer occupancy data to the scheduler, the scheduler is configured to pause the scheduling of instructions based on the buffer occupancy data and is configured to send an indication of the pause of scheduling to the trace impact counter, and the trace impact counter is configured to add the number of cycles for which scheduling of instructions has been paused to trace data sent to the trace output buffer.

4. A data processor according to claim 3, wherein the buffer occupancy data is an indication that the trace output buffer is full.

5. A data processor comprising:
    a plurality of functional units for processing program instructions;
    an instruction fetch unit for fetching program instructions from a memory;
    an instruction scheduler, connected to the instruction fetch unit and to the plurality of functional units for determining when the fetched instructions are issued to the functional units;
    a trace pipeline data output connected to the scheduler for outputting trace data relating to the operation of the processor, wherein the trace pipeline data output comprises a plurality of stages corresponding to stages of execution in the plurality of functional units; and
    a trace output buffer connected between the output of the trace pipeline and the trace output for storing trace data prior to passing it to the trace output and a trace impact counter connected to the trace output buffer and to the scheduler,
    wherein the instruction fetch unit includes branch prediction logic that is used to determine which instructions are fetched from memory following the fetching of a branch instruction, wherein the instruction fetch unit is configured to output branch prediction information associated with fetched instructions to a sideband register and the scheduler is configured to receive the branch prediction information from the sideband register and to determine if the branch prediction information is correct by checking if a condition associated with the branch instruction has been met and is configured to add a result of the determination to the trace data, and
    wherein the trace output buffer is configured to send buffer occupancy data to the scheduler, the scheduler is configured to modify the scheduling of instructions based on the buffer occupancy data and is configured to send an indication of the modification of scheduling to the trace impact counter, the trace impact counter configured to track a number of cycles for which scheduling of instructions has been paused, and the trace impact counter is configured to add an indication of the modification of scheduling to trace data sent to the trace output buffer.

6. A data processor according to claim 5, wherein the branch prediction information is sent from the instruction fetch unit to the scheduler in parallel with, and synchronously with, corresponding fetched instructions.

7. A data processor according to claim 5, wherein the scheduler is configured to receive or determine interrupt or exception status information indicative of the processor entering a different operating mode, and wherein the scheduler is configured to include an indication of the interrupt or exception status information in the trace data.

8. A data processor according to claim 5, wherein the scheduler is configured to pause scheduling of instructions based on the buffer occupancy data.

9. A data processor according to claim 5, wherein the buffer occupancy data is an indication that the trace output buffer is full.

* * * * *